Oct. 12, 1943.   R. K. STOUT   2,331,354
VARIABLE SPEED MOTOR CONTROL
Filed June 4, 1941   2 Sheets-Sheet 1
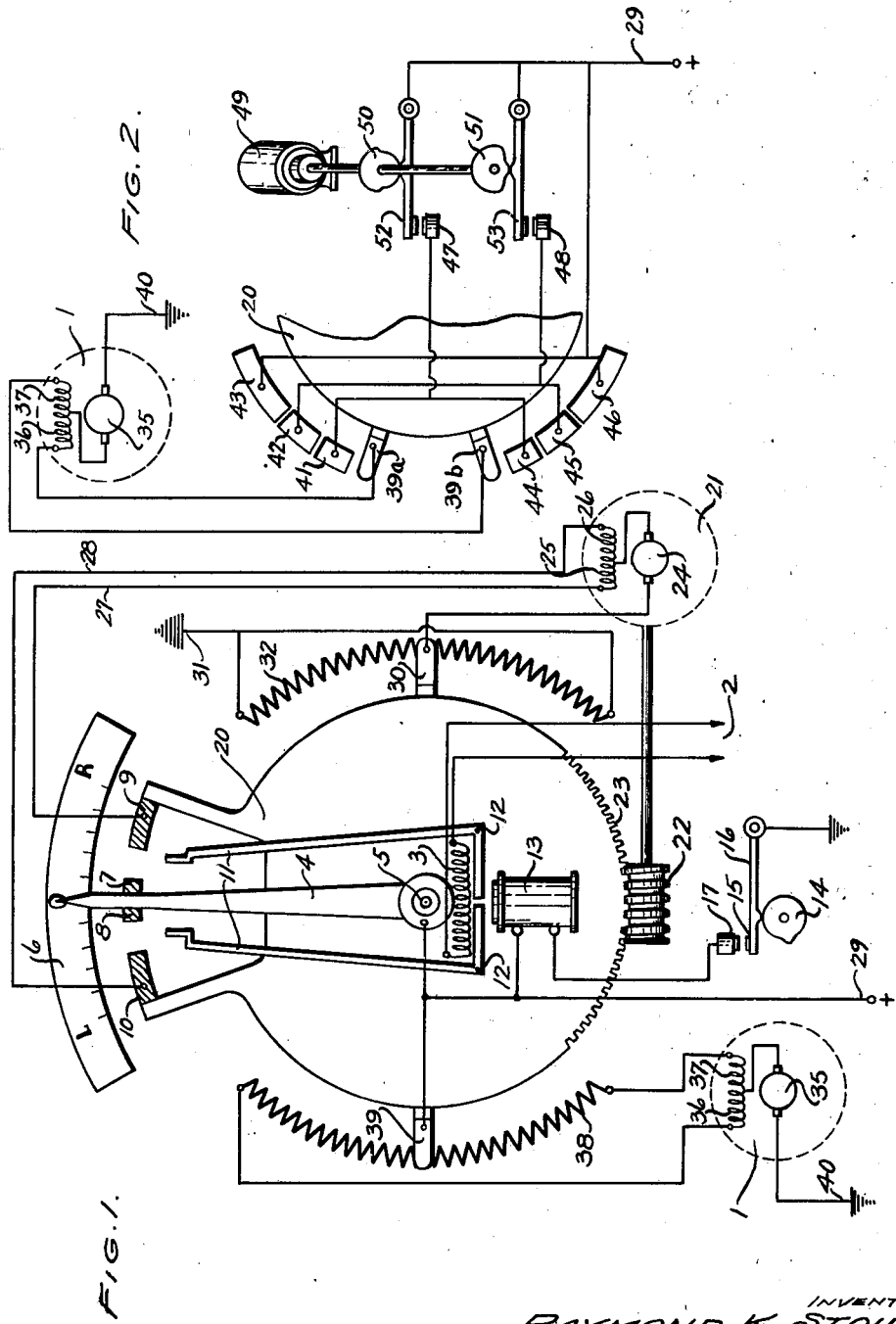
INVENTOR
RAYMOND K. STOUT Oct. 12, 1943.  R. K. STOUT  2,331,354
VARIABLE SPEED MOTOR CONTROL
Filed June 4, 1941  2 Sheets-Sheet 2

INVENTOR
RAYMOND K. STOUT
BY
ATTORNEYS

Patented Oct. 12, 1943

2,331,354

UNITED STATES PATENT OFFICE 2,331,354

VARIABLE SPEED MOTOR CONTROL

Raymond K. Stout, Dayton, Ohio

Application June 4, 1941, Serial No. 396,592

15 Claims. (Cl. 172—239)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a variable-speed control for electric motors, and has particular reference to the controlling of motors by a sensitive instrument or the like.

The general object of the invention is to provide an improved system for controlling an electric motor by a sensitive instrument.

A particular object is to provide an improved control system for an electric motor such that the direction of rotation of the motor corresponds to the left-right sensing of a sensitive instrument, and the speed of the motor is governed by the angular deflection of the instrument pointer.

A further object is to provide an improved system for varying the speed of a motor throughout a wide range in either direction of rotation.

A further object is to provide improved means for increasing the contact pressure of a movable contact in a sensitive instrument.

A still further object is to provide improved means for automatically returning the contact pointer of a sensitive instrument approximately to its zero position after engagement with a fixed contact.

In carrying out the principal objects of the invention, a number of modifications are herein disclosed having basic features in common. These modifications are directed particularly to the control of a variable-speed, reversible electric motor which may be employed to perform any function for which it is suited, where the speed and direction of rotation are to be under the control of a sensitive instrument responsive to some condition. As herein illustrated, the sensitive instrument has a pointer or contact arm capable of left and right indications of various magnitudes in response to variations of the particular condition concerned. The contact arm normally assumes a zero center position in which it remains poised between two relatively stationary contacts, when not being influenced by the controlling condition. When the condition produces a sufficient response in the instrument, the contact arm will engage one or the other of the relatively stationary contacts, closing a control circuit. The control circuit then energizes motor means to shift the relatively stationary contacts to a new position with respect to the instrument such that the contact arm will remain substantially poised between the relatively stationary contacts while still responding to the condition. This shifting involves a movement of a movable element which is effective to move either the relatively stationary contacts, or the instrument itself, to establish temporarily the described relationship. It is of course appreciated that any such adjustment in response to the controlling condition usually involves a sequence of operations, and, if the condition is changing, the adjustments must change correspondingly. The movable element in turn controls the variable-speed, reversible motor, the direction of shift of the movable element from an original neutral position determining the direction of rotation of the motor, and the amount of the shift determining the speed of the motor. Each variation in the deflection of the contact arm in response to a change in the condition will establish a new position for the movable element, resulting in a corresponding correction of the speed of the motor to be controlled. The above-described characteristics of operation are common to all of the modifications illustrated.

The invention comprises various specific means in the several modifications for making the speed of the motor vary according to the magnitude of the response of the sensitive instrument. The invention further comprises means for varying the speed of movement of the movable member in accordance with the magnitude of the response of the sensitive instrument, and improved means for increasing the contact pressure of the movable element, all of which are fully explained in the detailed description which follows.

Further objects and advantages in addition to those already pointed out will become apparent as the description proceeds in connection with the accompanying drawings, in which:

Fig. 1 is a schematic representation of one embodiment of the invention;

Fig. 2 is a fragmentary view showing a different manner of varying the energy input to the motor to be controlled.

Figure 3:
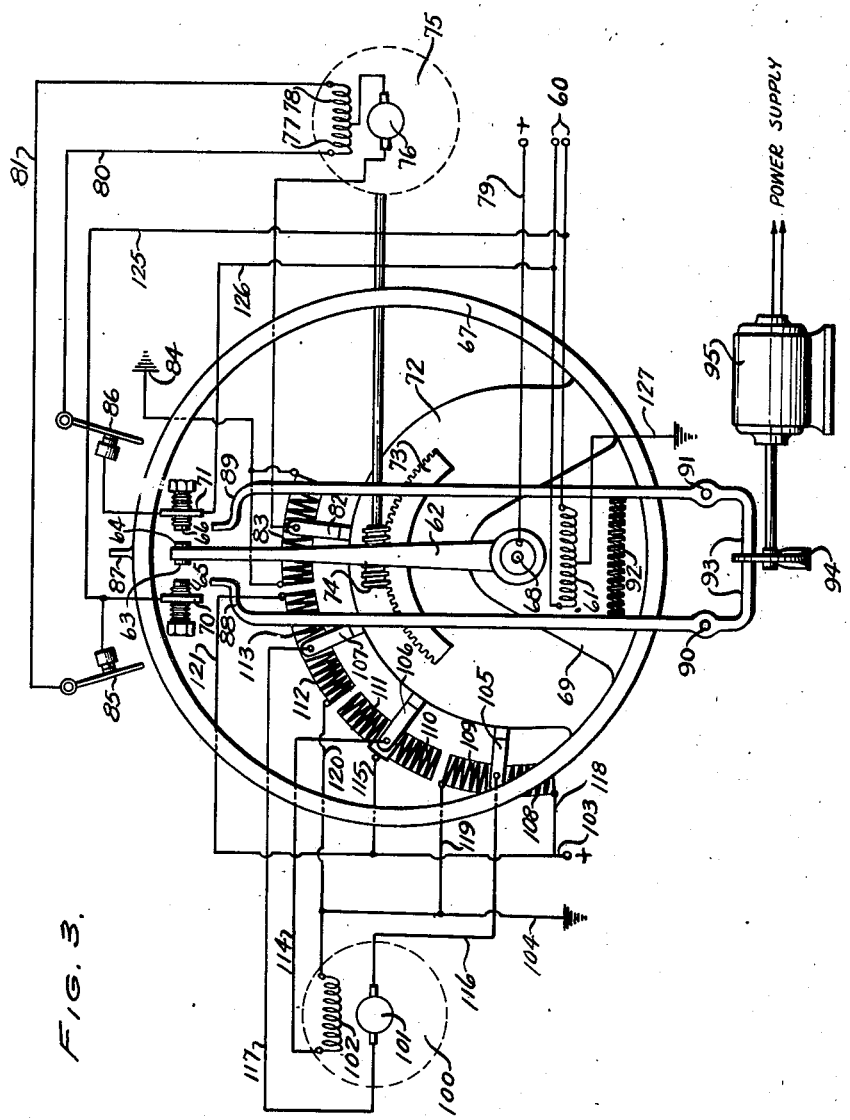
Fig. 3 is a schematic representation of a further modification of the invention.

In the embodiment shown in Fig. 1 it is desired to control the operation of the motor 1 in accordance with some condition which is influencing a responsive circuit 2 connected with the energizing winding 3 of a sensitive instrument. In the present illustration, the sensitive instrument may be assumed to be a left-right indicator having an indicating pointer and contact arm 4 pivoted at 5 and movable in opposite directions from the zero center position illustrated, in response to energization of the instrument winding 3 through the circuit 2. Thus the circuit 2, and the instrument comprising the winding 3 and the pointer 4, may, for purposes of illustration, represent the conventional left-right indicating system as used on aircraft, which is well known in the art. The radio receiver and selective means for distinguishing the left and right signals to produce the proper response in the left-right indicator are not illustrated. The motor 1 may be employed in the present case in an automatic pilot to operate a rudder control on an aircraft or ship, or it may be used to keep a directional receiving antenna constantly oriented toward a particular transmitter. Such uses of the present invention, however, are purely illustrative, since the motor 1 may be employed for any other purpose, such as to operate a valve, rheostat, or the like; and the responsive circuit 2 may likewise be designed to respond to any desired condition, such as pressure, temperature, velocity, or the like.

If desired, a scale 6 may be provided to give a visual indication of the operation of the sensitive instrument, but this scale is not necessary in the present invention.

The contact arm 4 of the sensitive instrument, in responding to the influence of the energizing winding 3, is adapted to move to the right or to the left of the zero center position shown, and these movements are herein utilized to produce proportionate control effects upon the operation of the motor 1. The arm 4 carries a pair of light weight contacts 7 and 8 adapted to engage complementary contacts 9 and 10, the latter being designated, for convenience, as a set of relatively stationary contacts. In the present embodiment, the sectional representations of the contacts 7, 8, 9, and 10 indicate magnetic material, 9 and 10 being permanent magnets, whereby a slight deflection of the arm 4 from its zero center position will result in attraction to one or the other of the relatively stationary contacts 9 and 10. This expedient provides sufficient contact pressure for the proper functioning of the control circuits established by the contact arm 4.

Obviously, when contact is once made, the magnetic attraction will tend to prevent separation of the contacts, and so positive means are provided to periodically break the engagement of the contacts and return the arm 4 to an approximately central position between the contacts 9 and 10 for further response to the energizing winding 3. In Fig. 1 these positive means comprise a pair of tongs 11 pivoted at 12 and adapted to be periodically actuated by an electromagnet 13 to center the arm 4 between the contacts 9 and 10. The electromagnet 13 is intermittently energized by a constant-speed cam or the like 14, which is adapted to move a contact 15 on a pivoted arm 16 into intermittent engagement with a fixed contact 17. The timing of the cam 14 is such as to allow sufficient time for the arm 4 to move the contacts 7 and 8 into engagement with one of the fixed contacts and to allow such engagement to be maintained momentarily before the tongs 11 are caused to break the engagement.

The contacts 9 and 10, herein described as relatively stationary, are mounted upon a rotatable plate or member 20 having a common axis of rotation with the contact arm 4. As illustrated in Fig. 1, the numeral 5 then represents the center of rotation of both the contact arm 4 and the member 20, but there is no positive connection therebetween. Means are provided for rotating the plate 20 in either direction, comprising a motor 21, worm 22, and teeth 23 on the plate 20. Motor 21 is represented as having an armature 24 and a pair of field windings 25 and 26—the field winding 25 being operable to drive the motor in one direction, and the field winding 26 being operable to drive the motor in the opposite direction. The windings 25 and 26 are connected with the respective contacts 9 and 10 by means of the leads 27 and 28 in such a manner that when the contact arm 4 deflects to the right, a circuit is completed from the positive source 29 through the arm 4, the contacts 7 and 9, the conductor 27, the field winding 25, armature 24, and the contact finger 30, to ground 31, causing the plate 20 to rotate in a clockwise direction. When the contact arm 4 is deflected in a counter-clockwise direction a circuit will be completed from source 29 through the arm 4, the contacts 8 and 10, conductor 28, field winding 26, armature 24, and contact finger 30, to ground 31, producing rotation of plate 20 in a counterclockwise direction. Motor 21 need not be a D. C. motor, nor have the specific internal connections illustrated, but may be of any type wherein rotation in one direction may be effected by energizing conductor 27, and rotation in the opposite direction effected by energizing the conductor 28. A potentiometer 32 in the ground connection causes the motor 21 to run faster as the plate 20 departs in either direction from the position shown, which may be termed a neutral position. The so-called neutral position of the rotatable plate 20 may be defined as the position in which the contacts 9 and 10 are symmetrically positioned on opposite sides of the contact arm 4 when the latter is in its zero center position.

The operation of the parts thus far described is as follows: When the contact arm 4 and the plate 20 occupy the zero center and neutral positions, respectively, as shown, the mechanism will be at rest with all power circuits open, except for the periodic closing of the contacts 15 and 17 to operate the tongs 11. Assuming that a signal is received in the circuit 2 such as will cause a deflection of the contact arm 4 in a clockwise direction, it will be seen that the circuit established through the contacts 7 and 9 will result in clockwise rotation of the plate 20 in the manner described. This rotation, however, will continue only momentarily, due to the action of the cam 14 whereby the tongs 11 break the engagement of contacts 7 and 9 and return the arm 4 and the contacts 7 and 8 to an open circuit position, breaking the circuit through the motor 21. As soon as contacts 15 and 17 again separate, the arm 4 is free to again respond to the energizing winding 3 of the sensitive instrument.

After the elapsed interval of time occasioned by operation of the tongs 11 one of three things may happen—the winding 3 again deflect the contact arm to the right; it may produce an opposite deflection, that is, to the left; or it may at this time produce no deflection at all, leaving the contact arm at rest. However, it will be noted that inasmuch as the first engagement of contacts 7 and 9 has caused rotation of the plate 20 a certain extent in a clockwise direction, a lack of response in the circuit 2 at this time, such as would allow the arm 4 to come to rest opposite the zero of the scale 6, would result in engagement of the contacts 8 and 10 to rotate the plate 20 in a counterclockwise direction and substantially restore the parts to their original positions. The above restoring action would take place only when the condition producing a response in the circuit 2 no longer existed after the first actuation of the contact arm 4.

If the response in the circuit 2 continued, so as to produce repeated actuations of the contact arm 4 to the right after each return by the tongs 11, each such actuation would cause the plate 20 to rotate further to the right, and at increasing speed, until finally the deflection of the contact arm would no longer be sufficient to bring the contact 7 into engagement with the contact 9. As long as this relationship prevails, the arm 4 will seek a position approximately intermediate the contacts 9 and 10 each time it is released by the tongs 11, and no further shifting of the plate 20 will occur until there is an increase or decrease of response in the circuit 2.

It is understood in the operation above described that the scale 6 is fixed to the body of the sensitive instrument, both of which are stationary, and that the tong mechanism 11 rotates with the plate 20 so as to return the arm 4, not to the zero position on the scale 6, but to a mid position between the contacts 9 and 10. Thus the arm 4 will give a significant reading on the scale 6 each time it is released from the clamping action of the tongs 11, and the plate 20 will follow the deflection of the arm 4. To insure that the plate 20 will follow the arm 4, the speed of the driving mechanism of the motor 21 should be correlated with the speed of the cam 14 and the speed of the swing of the arm 4 under the influence of the energizing coil 3, so that the plate 20 will not unduly lag in shifting its position with each change in deflection of the arm 4. This follow-up action is accelerated by the potentiometer 32 which causes the motor 21 to operate faster for large corrections than for small ones.

As has been stated, the object of the above-described mechanism is to provide control for the motor 1 in accordance with the response of a circuit 2 to some condition. The motor 1 is illustrated as comprising an armature 35 and a pair of field windings 36 and 37 for rotating the armature in opposite directions. The field windings have their terminals connected to the ends of a potentiometer 38 over which rides a contact finger 39 on the plate 20. With the plate 20 in the neutral position as shown in Fig. 1, a circuit is established from the source 29 through the contact finger 39, both field windings 36 and 37, armature 35, to the ground 40. The motor 1 would remain inactive, due to the equal and opposite energization of fields 36 and 37. Movement of the contact finger 39 in either direction from the neutral position shown would result in increasing one field and decreasing the other field to produce rotation of the motor 1 in a direction depending upon the direction of movement of the finger 39 from its neutral position. It is apparent that the cutting out of series resistance in the potentiometer 38 will cause the speed of rotation of the motor 1 in either direction to vary with the departure of the contact finger 39 from the mid position, or maximum resistance position, of the potentiometer 38. It will thus be seen that the motor 1 will respond in sense and speed to the sense and magnitude of the response in the circuit 2, to provide an improved proportionate control system characterized by quick response and freedom from hunting.

The contacts 7 and 8 are in electrical engagement with the arm 4 and the contacts 9 and 10, and contact fingers 30 and 39 are insulated from each other and from the rotatable plate 20 upon which they are mounted.

It is seen that the mechanism of Fig. 1 varies the speed of rotation of the motor 1 by varying the applied potential of the energy input in accordance with the required control effects. There is shown in Fig. 2 a modification in which variation in speed of the motor 1 is produced by varying the time intervals of application of an energy input of constant value through the use of periodic interrupting means. Parts corresponding to parts in Fig. 1 bear like reference numerals. In Fig. 2 the rotatable plate 20 is provided with a pair of contact fingers 39a and 39b connected with the opposing field windings 36 and 37 in the manner shown. Rotation of the plate 20 in a clockwise direction from the neutral position shown carries the contact finger 39a over the contact segments 41, 42, and 43, and maintains the contact finger 39b in open circuit positions. Rotation of the plate 20 in a counterclockwise direction carries the contact finger 39b over the contact segments 44, 45, and 46, and maintains the contact finger 39a in open circuit positions. Contact segments 41 and 44 are connected with a contact 47, contact segments 42 and 45 are connected with a contact 48, and contact segments 43 and 46 are connected directly to the power source 29. A constant-speed motor 49 drives the cams 50 and 51 to periodically operate the switch arms 52 and 53 respectively, to complete circuits to the contacts 47 and 48. Cams 50 and 51 are designed to hold their respective circuits closed for different time intervals, the cam 50 in the present embodiment holding its circuit closed for approximately one-third of the time during each revolution, and the cam 51 holding its circuit closed for approximately two-thirds of the time during each revolution.

Assuming now that the plate 20 is rotated slightly in a clockwise direction to produce a small response in the motor 1 in a given sense, it will be seen that the desired result is achieved through the intermittent energization of the circuit through contact 47 and contact segment 41, energizing the motor 1 at full potential during one-third of each revolution of the cam 50, so that the motor 1 receives in a given time one-third of the total energy input obtainable from the source 29. A still further shift of the plate 20 in a clockwise direction, calling for a greater effort on the part of the motor 1, will be seen to bring the contact finger 39a into engagement with the contact segment 42, establishing a circuit through the contact 48 which is energized two-thirds of the time, thereby applying in a given time two-thirds of the energy input obtainable from the source 29. Rotation of the plate 20 sufficient to bring the contact finger 39a into engagement with the contact segment 43 will establish direct connection with the source 29, applying the full time energy output thereof to the motor 1 for high speed operation. It will be appreciated that rotation of the plate 20 in the counterclockwise direction from the neutral position shown will produce the same sequence of changes in the energy input to the motor 1 except that the motor will rotate in the opposite direction, corresponding to a correction of opposite sense in the circuit 2.

The modification shown in Fig. 3 involves the same fundamental principles of operation as the device of Fig. 1. A condition-responsive circuit 60 is connected with an energizing winding 61 of a sensitive instrument having a movable pointer or contact arm 62 carrying a pair of contacts 63 and 64. Contacts 63 and 64 are adapted to engage the relatively stationary contacts 65 and 66 respectively. The sensitive instrument containing the winding 61 is provided with a pivot 68 for the pointer 62, the instrument itself being contained in a member 67 which is mounted rotatably upon bearings also having an axis aligned with the pivot axis 68. The member 67 is illustrated as being in the form of a cylindrical housing which may conveniently replace the housing of a conventional instrument, providing at the same time for the described rotation of the housing and instrument bodily about the axis 68. The bracket 69 represents a rear journal or bearing support for the member 67 to effect this rotation. By virtue of this construction the contact arm 62 is free to rotate about the axis 68 in response to the influence of the energizing winding 61 in the normal manner, and at the same time, by revolving the member 67, the instrument itself may be bodily rotated about the contact arm 62. This allows the above-described relatively stationary contacts 65 and 66 to be carried by the fixed or stationary brackets 70 and 71. Thus the only movement of contacts 65 and 66 is through their screw-threaded engagement with the brackets 70 and 71 for adjustment purposes, there being no movement of these contacts in the operation of the device.

Member 67 carries another interior lobe or bracket 72 having a worm gear segment 73 thereon. The worm 74 operated by the motor 75 therefore is capable of rotating member 67 and the sensitive instrument about the axis 68. Motor 75 is illustrated as comprising an armature 76 and opposed field windings 77 and 78, the connections thereto corresponding to the connections described in Fig. 1.

The contact arm 62 is adapted to establish a circuit from the source 79 to either one of the field windings 77 or 78 through the contacts 65 and 66 and the associated lines 80 and 81, depending upon the sense of the deflection. The circuit for the motor 75 is completed through an insulated contact finger 82 on the bracket 72, which engages a potentiometer 83 in the circuit to the ground 84, as in Fig. 1. Limit switches 85 and 86, operable by a projection 87 on the member 67, are provided as a safety precaution for stopping the motor 75 when the member 67 has reached its designed limit of movement in either direction. It is understood that the limit switches 85 and 86 ordinarily remain closed and do not function in the normal operation of the mechanism.

A modified form of tongs is illustrated in Fig. 3 for periodically centering the contact arm 62. These tongs are indicated at 88 and 89, being pivoted on fixed pivots 90 and 91 and normally separated by means of a spring or the like 92. The tongs are provided with inwardly turned ends 93 which are adapted to be cammed apart periodically by a cam 94 on a constant-speed motor or the like 95. Cam 94 is designed to produce proper timing of the centering action with respect to the time constants of the sensitive instrument and the speed of rotation of the member 67. By virtue of the fact that the spring 92 urges the tongs 88 and 89 to separate, sloping faces may be provided on the cam 94 to produce a gentle clamping action on the arm 62 free of shock and jar such as is experienced with snap-acting tongs of the type illustrated in Fig. 1. This greatly reduces the abuse of the sensitive instrument and permits a more delicate instrument to be used.

The motor to be controlled in the embodiment of Fig. 3 is indicated at 100 and comprises an armature 101 and a single field winding 102. The power source is shown as comprising a positive terminal 103 and a ground 104. Control means for the motor 100 comprise three insulated contact fingers 105, 106 and 107 carried by the bracket 72 on the member 67 and movable over a plurality of resistance elements. Contact finger 105 is movable over the resistance elements 108 and 109, the contact finger 106 is movable over the resistance elements 110 and 111, and the contact finger 107 is movable over the resistance elements 112 and 113. Contact fingers 105, 106, and 107 are all illustrated in Fig. 3 as occupying neutral or open circuit positions with respect to the motor 100.

The field circuit for the winding 102 is seen to comprise positive terminal 103, wire 115, the resistance element 110 or 111, contact finger 106, wire 114, field winding 102, and ground wire 104. Slight movement of the contact finger 106 in either direction from the neutral position will energize the field winding at substantially full potential, and further movement will continue the energization of the field winding at decreasing potentials.

The contact fingers 105 and 107 are connected with the armature by wires 116 and 117 respectively, and are operable in their movements to vary both the polarity and the potential of the voltage applied across the armature. The resistance 108 is connected with the positive terminal 103 by the wire 118 and extends almost into contact with the finger 105 in its neutral position. The resistance 109 is connected with the ground line 104 by the wire 119 and extends almost into contact with the finger 105 in its neutral position, the relationship of the resistances 108 and 109 and the contact finger 105 being such that an open circuit position is provided for the contact finger between the two resistances, a slight movement of the contact finger being necessary in one direction or the other to connect the armature line 116 with a source of power. Similarly, a resistance 112 is connected by means of the wire 120 with the ground line 104, and the resistance 113 is connected through the wire 121 with the positive terminal 103. The resistances 112 and 113 are not connected together, being spaced to provide an open circuit neutral position for the finger 107.

Thus it will be seen that a slight rotation of the member 67 in a clockwise direction will connect the armature line 117 with the positive terminal 103, through resistance 113; and the armature line 116 with the ground terminal 104, through resistance 109; and that continued rotation of the member 67 will cut resistance out of the armature circuit; a field circuit meanwhile having been established and resistance progressively added to said circuit by the action of contact 106. It will be seen, then, that the combined action of increasing the armature voltage and reducing the field voltage will be effective to vary the speed of motor 100 throughout a very wide range in response to slight movement of the member 67.

A slight rotation of the member 67 in a counterclockwise direction from the neutral position will be seen to again establish armature and field connections and to reverse the polarity of the voltage applied to the armature, thereby reversing the direction of rotation of the motor. Further counterclockwise rotation of member 67 will effect speed control in exactly the same manner just described. It is noted that the mechanism described in connection with Fig. 3 will effect rotation of the member 67 counter to the deflection of the contact arm 62 so as to tend to maintain the arm normally spaced between contacts 65 and 66 in its continued response to the circuit 60. Any change in response in the circuit 60 will result in momentary contact at either 65 or 66 to further correct the position of the member 67 about the axis 68, and each shift in position of the member 67 will produce a corresponding effect upon the motor 100, the effect corresponding in sense and being proportionate in degree to the response called for by the circuit 60.

In the embodiment of Fig. 3, improved means are provided for increasing the contact pressure of the arm 62 without accelerating its movement. For this purpose the contact 65 is connected by wire 125 with one side of the energizing winding 61 of the sensitive instrument, and the contact 66 is connected by wire 126 with the other side of the winding 61. The winding 61 is provided at its mid point with a ground connection. The polarity of the wires 125 and 126 with respect to the magnetic field of the energizing winding 61 is so selected that when the arm 62 engages contact 65, the circuit from the terminal 79 through pointer 62, contacts 63 and 65, line 125, half of coil 61, and ground 127 will increase energization of half of the coil 61 to tend to increase the deflection of the pointer 62 in a counterclockwise direction and thereby increase the contact pressure between contacts 63 and 65. When contact is made between contacts 64 and 66, the circuit completed from the source 79 through wire 126 will increase the energization of the other half of the energizing winding 61, reversing the polarity of the field from that just described, which will tend to increase the deflection of the pointer 62 in a clockwise direction and increase the contact pressure between contacts 64 and 66.

It will be appreciated that it is desirable in an instrument of this type to increase the contact pressure after contact is made, in order to carry the necessary control currents, and that it is undesirable to modify the characteristics of the instrument in so doing. The above described contact pressure increasing means will not accelerate the motion of the arm 62, since it exerts no effect until contact is first established. Thus the inherent proportioning action resulting from the varying degrees of influence upon the swing of the pointer 62 produced by the circuit 60 will not be affected.

It is to be understood that the invention is capable of many modifications. Changes, therefore, in the construction and arrangement may be made which do not depart from the spirit and scope of the invention as defined in the appended claims. For instance, D. C. circuits are illustrated to facilitate tracing the wiring diagrams, but the invention is not limited thereto as alternating current motors of the reversible, variable speed type may be used. Also, the arrangement of the potentiometers and control resistances in the manners illustrated would considerably limit the amplitude of movement of the plate 20 and the member 67. If greater amplitude of movement is desired, the various resistance windings may be decked in a well-known manner so as to occupy a smaller total arc. Again, the tongs 88, 89, in Fig. 3 might be dispensed with by making the polarity of the connections 125, 126 with the winding 61 such that the D. C. field from the source 79 would tend to separate the contacts 63, 64, 65, 66, instead of holding any engagement that was once made, thus automatically returning the arm 62 to a central position after each engagement with the fixed contacts 65 or 66.

Having now described my invention and the manner in which the same may be used, what I claim and desire to protect by Letters Patent is:

1. In a motor control, a contact arm, a pivotal support for said arm, a set of contacts complementary to said contact arm, a rotatable member pivoted coaxially with said arm and operative to produce relative rotation between said support and said set of contacts, means for rotating said member, energizing circuits for said means completed through said contacts in such a manner as to cause said member to maintain an approximate predetermined relationship between said set of contacts and said arm during movements of said arm, means to increase the contact-engaging pressure between said arm and said contacts, means to intermittently break the engagement of said arm and said contacts, and means on said member to control a motor in accordance with the position of said member.

2. In a variable-speed motor control, a sensitive instrument having a pivoted contact arm, a set of contacts adapted to be selectively engaged by said contact arm upon movement of said arm, a rotatable member pivoted coaxially with said arm and operative to produce relative rotation between said instrument and said set of contacts, the engagement of said contact arm and said contacts upon movement of said arm completing circuits for rotating said member so as to maintain an approximate predetermined relation between the arm and said contacts, means to increase the contact-engaging pressure between said arm and said contacts, means to intermittently break the engagement of said arm and said contacts, and means on said member to control the speed and direction of rotation of a motor in accordance with the position of said member.

3. In a variable-speed motor control, a sensitive instrument having a pivoted contact arm, a set of contacts selectively engageable by said contact arm upon movement of said arm, a rotatable member pivoted coaxially with said arm and operative to produce relative rotation between said instrument and said set of contacts, a motor for rotating said member, a circuit including one contact of said set of contacts for causing rotation of said motor in one direction, a circuit including another contact of said set of contacts for causing rotation of said motor in the opposite direction, means for varying the speed of said motor in accordance with the position of said member, and means on said member to control the speed and direction of rotation of a second motor in accordance with the position of said member.

4. In a variable-speed motor control, a sensitive instrument having a pivoted contact arm, said arm normally assuming a zero center position when no control is being exerted by said instrument; a first contact adapted to be engaged by said arm upon movement of the latter in one direction, a second contact adapted to be engaged by said arm upon movement of the latter in the opposite direction; a rotatable member pivoted coaxially with said arm and operative to produce relative rotation between said instrument and said first and second contacts; a motor for rotating said member, said member having a neutral position in which the first and second contacts are not in engagement with said arm when the arm is in its zero center position; a circuit through said first contact and said contact arm for causing rotation of said motor in a direction tending to separate said last-mentioned contacts when the latter are engaged; a circuit through said second contact and said contact arm for causing rotation of said motor in a direction tending to separate said last-mentioned contacts when the latter are engaged; means on said member for increasing the speed of said motor as said member departs from its neutral position; means to increase the contact-engaging pressure between said arm and said first and second contacts; means to intermittently break the engagement of said arm with said contacts; and means on said member to cause rotation of a second motor in one direction when said member departs from its neutral position in one direction and to cause rotation of said second motor in the opposite direction when said member departs from its neutral position in the opposite direction, the speed of rotation of said second motor increasing with the departure of said member from its neutral position.

5. In a motor control, a contact arm; a pivotal support for said arm; a set of contacts complementary to said contact arm; a rotatable member pivoted coaxially with said arm and operative to produce relative rotation between said support and said set of contacts; a motor for rotating said member, one terminal of said motor being connected with a contact finger on said rotatable member movable across a potentiometer, the ends of said potentiometer being connected together to a source of electrical supply, said motor having two windings to produce rotation in opposite directions, each of said windings being energized through one of said contacts of said set of contacts in such a manner as to cause said member to maintain an approximate predetermined relationship between said contacts and said contact arm during movements of said arm; and means on said member to control a second motor in accordance with the position of said member.

6. In a variable-speed motor control system, a contact arm; a pivotal support for said arm; a set of contacts complementary to said contact arm; a rotatable member pivoted coaxially with said arm and operative to produce relative rotation between said support and said set of contacts; a motor for rotating said member, one terminal of said motor being connected with a contact finger on said movable member movable across a potentiometer, the ends of said potentiometer being connected together to a source of electrical supply, said motor having two windings to produce rotation in opposite directions, each of said windings being energized through one of said contacts of said set of contacts in such a manner as to cause said member to maintain an approximate predetermined relationship between said contacts and said contact arm during movements of said arm; and means on said member to control a second motor in accordance with the position of said member, said second motor being provided with a set of windings for rotation in each direction, said windings being serially connected and in parallel with a potentiometer, and said last-mentioned means comprising a contact finger on said movable member movable across said potentiometer and connected with a source of electrical supply.

7. In a variable-speed motor control, a sensitive instrument having a pivoted contact arm, said contact arm occupying a zero center position when it is not being influenced by said instrument; a rotatable member pivoted coaxially with said arm; a pair of contacts on said member on opposite sides of said contact arm; means to increase the contact-engaging pressure between said arm and the contacts on said member; means to intermittently break the engagement of said arm with said contacts; a reversible motor for rotating said member; an energizing circuit for said motor completed through said arm and one of the contacts on said member for causing operation of said motor in one direction; an energizing circuit through said arm and another of the contacts on said member for causing operation of said motor in the opposite direction, whereby said member will tend to follow the movements of said arm; means for increasing the speed of rotation of said motor as said member and said arm depart from the zero center position; and means on said member for energizing a second motor so as to rotate in one direction when said member departs in end direction from the zero center position, and to rotate in the opposite direction when said member departs from the neutral position in the opposite direction, the speed of rotation of said second motor increasing with the departure of said member from said zero center position.

8. In a variable-speed motor control, a sensitive instrument having a pivoted contact arm; a set of contacts selectively engageable by said contact arm upon movement of said arm; a rotatable member pivoted coaxially with said arm and operative to produce relative rotation between said instrument and said set of contacts; a motor for rotating said member; a circuit including one contact of said set of contacts for causing rotation of said motor in one direction; a circuit including another contact of said set of contacts for causing rotation of said motor in the opposite direction; means for varying the speed of said motor in accordance with the position of said member; and means on said member to control the speed and direction of rotation of a second motor in accordance with the position of said member, said last-mentioned means comprising contact finger means on said movable member operative to establish an open circuit for said second motor in one position of said member and to establish circuits successively upon progressive movement of said member in either direction from said one position to energize said motor intermittently for increasing time intervals, the direction of rotation of said second motor being determined by the direction of movement of said movable member from said one position.

9. In a variable-speed motor control, a sensitive instrument having a pivoted contact arm; a set of contacts selectively engageable by said contact arm upon movement of said arm; a rotatable member pivoted coaxially with said arm and operative to produce relative rotation between said instrument and said set of contacts; a motor for rotating said member; a circuit including one contact of said set of contacts for causing rotation of said motor in one direction; a circuit including another contact of said set of contacts for causing rotation of said motor in the opposite direction; means for varying the speed of said motor in accordance with the position of said member; and means on said member to control the speed and direction of rotation of a second motor in accordance with the position of said member, said last-mentioned means comprising a sequence of contact segments engageable in succession upon movements of said member, certain of said segments being connected with a circuit which is energized intermittently, the time intervals of energization being different for different segments to provide different values of time-energy inputs for said second motor corresponding to different positions of said member.

10. In a variable-speed motor control, a sensitive instrument having a pivoted contact arm; a rotatable member carrying said instrument and pivoted coaxially with said arm; a pair of relatively stationary contacts disposed one on each side of said arm; a motor for rotating said member; energizing circuits to cause rotation of said motor in opposite directions, one of said circuits being completed through said arm and one of said stationary contacts, and the other of said circuits being completed through said arm and the other of said stationary contacts so that said member will be rotated in a direction opposite to the movement of said arm to tend to maintain said arm in a position between said stationary contacts and out of engagement therewith; and means on said member to control the speed and direction of rotation of a second motor in accordance with the position of said member.

11. In a variable-speed motor control, a sensitive instrument having a pivoted contact arm; a rotatable member carrying said instrument and pivoted coaxially with said arm; a pair of relatively stationary contacts disposed one on each side of said arm; means to increase the contact-engaging pressure between the said arm and said stationary contacts; means for intermittently breaking the engagement of said arm and said contacts comprising a pair of cam-operated clamping tongs; a motor for rotating said member; energizing circuits to cause rotation of said motor in opposite directions, one of said circuits being completed through said arm and one of said stationary contacts, and the other of said circuits being completed through said arm and the other of said stationary contacts so that said member will be rotated in a direction opposite to the movement of said arm to tend to maintain said arm in a position between said stationary contacts and out of engagement therewith; and means on said member to control the speed and direction of rotation of a second motor in accordance with the position of said member.

12. In a variable-speed motor control, a sensitive instrument having a pivoted contact arm; a rotatable member carrying said instrument and pivoted coaxially with said arm; a pair of relatively stationary contacts disposed one on each side of said arm; a motor for rotating said member; energizing circuits to cause rotation of said motor in opposite directions, one of said circuits being completed through said arm and one of said stationary contacts, and the other of said circuits being completed through said arm and the other of said stationary contacts so that said member will be rotated in a direction opposite to the movement of said arm to tend to maintain said arm in a position between said stationary contacts and out of engagement therewith, said energizing circuits including limit switches operable by said member to prevent rotation of said member beyond predetermined limits; and means on said member to control the speed and direction of rotation of a second motor in accordance with the position of said member.

13. In a variable-speed motor control, a sensitive instrument having a pivoted contact arm; a rotatable member carrying said instrument and pivoted coaxially with said arm; a pair of relatively stationary contacts disposed one on each side of said arm; a motor for rotating said member; energizing circuits to cause rotation of said motor in opposite directions, one of said circuits being completed through said arm and one of said stationary contacts, and the other of said circuits being completed through said arm and the other of said stationary contacts so that said member will be rotated in a direction opposite to the movement of said arm to tend to maintain said arm in a position between said stationary contacts and out of engagement therewith; and means on said member to control the speed and direction of rotation of a second motor in accordance with the position of said member, said means comprising a plurality of contact fingers on said rotatable member for energizing the armature and field of said second motor, said contact fingers being operable to open circuit said armature and field in one position of said member, said contact fingers being operable when rotated slightly in one direction from said one position to establish a low resistance field circuit and a high resistance armature circuit, further rotation of said fingers adding resistance in the field circuit and cutting resistance out of the armature circuit, said contact fingers being operable when rotated slightly in the opposite direction from said one position to establish a low resistance field circuit and a high resistance armature circuit of opposite polarity, further rotation of said fingers adding resistance in the field circuit and cutting resistance out of the armature circuit.

14. In a variable-speed motor control, a sensitive instrument having a pivoted contact arm; a set of contacts adapted to be selectively engaged by said contact arm upon movement of said arm; a rotatable member pivoted coaxially with said arm and operative to produce relative rotation between said instrument and said set of contacts, the engagement of said contact arm and said contacts upon movement of said arm completing circuits for rotating said member so as to maintain an approximate predetermined relation between the arm and said contacts; means to increase the contact-engaging pressure between said arm and said contacts, said means comprising a D. C. circuit which includes at least a part of the energizing winding of said sensitive instrument and said contacts upon engagement thereof and having a polarity tending to increase said contact pressure; means to intermittently break the engagement of said arm and said contacts; and means on said member to control the speed and direction of rotation of a motor in accordance with the position of said member.

15. In a variable-speed motor control for a motor having a field circuit and an armature circuit: a movable member having three contact fingers, each of said fingers being movable over a separate resistance unit; a first resistance unit having its mid point connected with a source of supply; a first contact finger on said member and connected in said field circuit, said first contact finger having an open circuit neutral position adjacent said mid point of said first resistance and being movable in either direction from said neutral position to establish said field circuit and progressively add resistance thereto; a second contact finger on said member and connected to one terminal of said armature, a pair of resistance elements associated with said second contact finger, said second contact finger having an open circuit neutral position between said resistance elements, the extremities of said resistance elements being connected to supply terminals of opposite polarity; a third contact finger on said member and connected with the other terminal of said armature, a pair of resistance elements associated with said third contact finger, said third contact finger having an open circuit neutral position between said resistance elements, the extremities of said resistance elements being connected to supply terminals of opposite polarity; said contact fingers being integrally associated with said member so as to move together as a unit, and the connections being such that when the contact fingers are in their neutral positions the armature and field circuits are open, movement of said contact fingers slightly in one direction establishing the armature and field circuits, further movement being effective to cut resistance out of the armature circuit and add resistance to the field circuit, movement of the contact fingers slightly in the other direction from their respective neutral positions first establishing a field circuit and an armature circuit of opposite polarity, and continued movement of the contact fingers in the said opposite direction being effective to cut resistance out of the armature circuit and add resistance to the field circuit.

RAYMOND K. STOUT.